US012353858B2

(12) United States Patent
Liu et al.

(10) Patent No.: US 12,353,858 B2
(45) Date of Patent: Jul. 8, 2025

(54) COMPILER SUPPRESSION OF INVISIBLE TROJAN SOURCE CODE

(71) Applicant: International Business Machines Corporation, Armonk, NY (US)

(72) Inventors: Su Liu, Austin, TX (US); Luis Osvaldo Pizana, Austin, TX (US); Boyi Tzen, Taipei (TW); Saritha Arunkumar, Woodley (GB)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 18/149,287

(22) Filed: Jan. 3, 2023

(65) Prior Publication Data

US 2024/0220618 A1    Jul. 4, 2024

(51) Int. Cl.
G06F 8/41    (2018.01)

(52) U.S. Cl.
CPC .......... G06F 8/41 (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 7,493,658 B2 | 2/2009 | Shipp | |
| 7,725,735 B2 | 5/2010 | Fox et al. | |
| 7,854,004 B2 | 12/2010 | van der Made | |
| 8,245,192 B1 * | 8/2012 | Chen | G06F 8/71 |
| | | | 717/122 |
| 8,549,635 B2 | 10/2013 | Muttik et al. | |
| 8,726,387 B2 | 5/2014 | Stahlberg et al. | |
| 8,776,239 B2 | 7/2014 | De Keukelaere et al. | |
| 2014/0359772 A1 * | 12/2014 | McCormack | G06F 21/561 |
| | | | 726/24 |
| 2024/0119151 A1 | 4/2024 | Liu et al. | |

FOREIGN PATENT DOCUMENTS

| | | |
|---|---|---|
| CN | 101673326 B | 4/2012 |
| EP | 2350903 B1 | 11/2016 |
| EP | 2157525 B1 | 1/2018 |

OTHER PUBLICATIONS

Boucher et al., "Trojan Source: Invisible Vulnerabilities," available at arXiv preprint arXiv:2111.00169, Oct. 2021, 15 pages.
Boucher, "Trojan Source," Oct. 5, 2022, 5 pages.

(Continued)

*Primary Examiner* — Lewis A Bullock, Jr.
*Assistant Examiner* — Mark A Gooray
(74) *Attorney, Agent, or Firm* — Yee & Associates, P.C.

(57) ABSTRACT

A computer implemented method compiles a source code. A computer system loads the source code into a first memory. The computer system loads a rendered source code into a second memory, wherein the rendered source code is a rendered version of the source code. The computer system determines whether a difference is present between the source code in the first memory and the rendered source code in the second memory. The computer system performs a set of actions in compiling the source code in response to determining that the difference between the source code and the rendered source code is present.

20 Claims, 12 Drawing Sheets

(56) References Cited

OTHER PUBLICATIONS

Wikipedia, "Bidirectional text," Wikimedia Foundation, Inc., last edited on Septeber 25, 2022, 9 pages.
Rapid Scan Static Team, "Don't let Trojan Source sneak into your code," Synopsys, Nov. 17, 2021, 9 pages.
Red Hat, "RHSB-2021-007 Trojan source attacks (CVE-2021-42574,CVE-2021-42694)," Red Hat Customer Portal, Nov. 1, 2021, 6 pages.
"Unicode Bidirectional Algorithm," Unicode, Unicode Standard Annex #9, Aug. 8, 2022, 46 pages.
"CVE-2021-42574 Detail," NIST, National Vulnerability Database, Nov. 11, 2021, 3 pages.
"IBM Watson," IBM, Jul. 27, 2022, accessed on Oct. 5, 2022, 3 pages.
Cimpanu, "New Trojan Source attack impacts compilers for most programming languages," Nov. 1, 2021, Copyright 2022, The Record by Recorded Future, 5 pages.
IBM: List of IBM Patents or Patent Applications Treated as Related, Filed January 3, 3023, 2 pages. (Appendix P).

\* cited by examiner

COMPILER SUPPRESSION OF INVISIBLE TROJAN SOURCE CODE

BACKGROUND

1. Field

The disclosure relates generally to an improved computer system and more specifically to a method, apparatus, system, and computer program product for suppressing the execution of invisible Trojan source code.

2. Description of the Related Art

Cybersecurity involves the protection of computer systems and networks from various malicious actions such as information disclosure, information theft, and damage to hardware, software, and data. Cybersecurity also includes protecting the systems from disruption or misdirection of services provided by the systems.

Many types of cybersecurity threats are present. For example, denial of service (DOS) attacks, direct access attacks, eavesdropping, phishing, privilege escalation, spoofing, and other kinds of cybersecurity issues are present. Trojan source vulnerability is a vulnerability that falls into a severe category. This category means that administrators and cybersecurity experts should give this type of vulnerability full attention.

The Trojan source vulnerability can affect any codebase regardless of the programming language. With the use of Unicode in displaying source code in browser interfaces using a bidirectional algorithm in the Unicode Specification through version 14.0. This algorithm performs a visual reordering of characters via control sequences and can be used to create source code that is rendered on a display showing a different logic than the logical ordering of tokens ingested by compilers and interpreters. In other words, the rendering of source code can result in a display of the source code that is different from the actual source code that can be compiled or interpreted and run. This vulnerability allows attackers to insert Trojan source code into almost any application creating a weakness for exploitation.

SUMMARY

According to one illustrative embodiment, a computer implemented method compiles a source code. A computer system loads the source code into a first memory. The computer system loads a rendered source code into a second memory, wherein the rendered source code is a rendered version of the source code. The computer system determines whether a difference is present between the source code in the first memory and the rendered source code in the second memory. The computer system performs a set of actions in compiling the source code in response to determining that the difference between the source code and the rendered source code is present. According to other illustrative embodiments, a computer system and a computer program product for compiling a source code are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
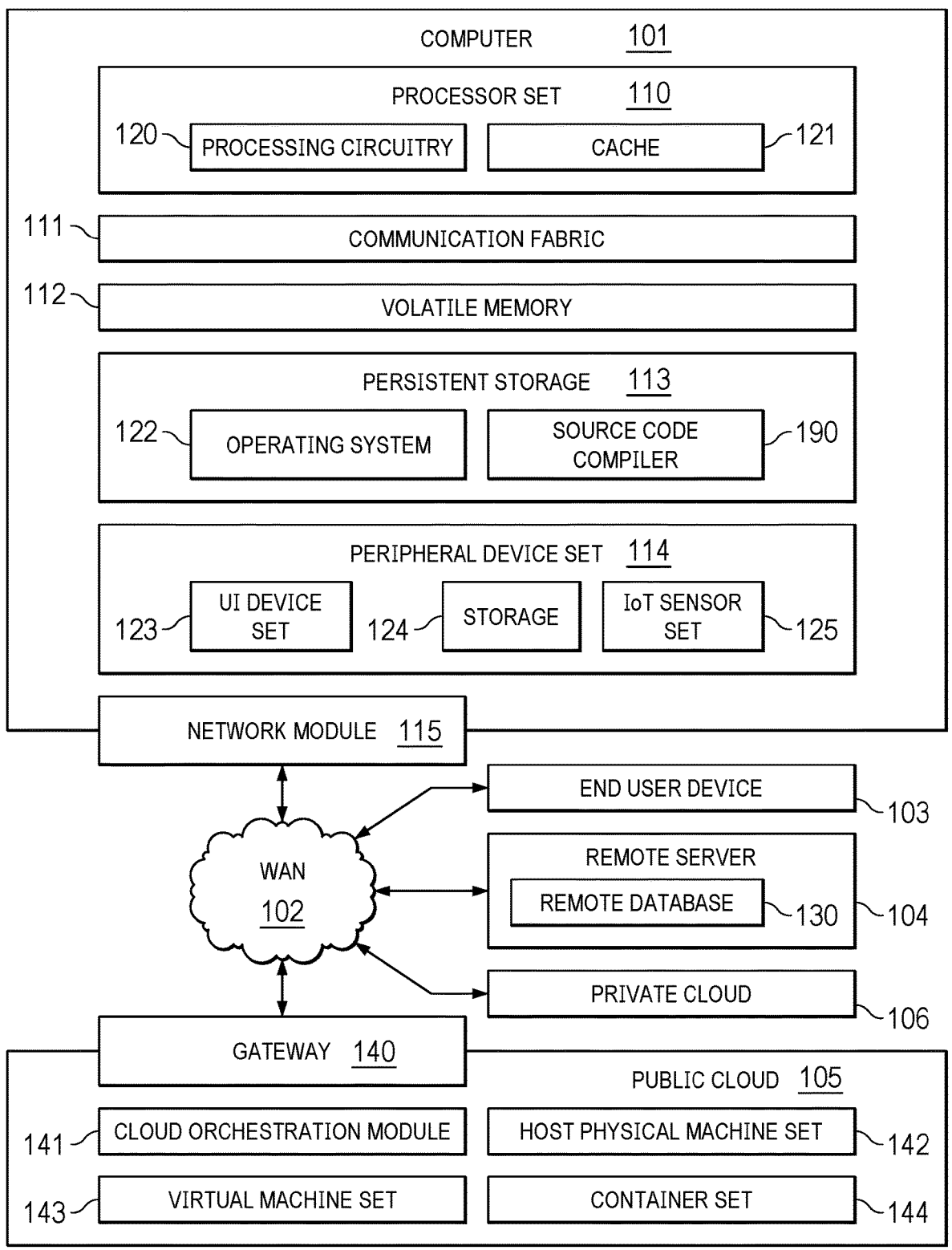
FIG. 1 is a block diagram of a computing environment in which illustrative embodiments can be implemented.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as source code compiler 190. In this illustrative example, source code compiler 190 can prevent one of more of the compiling, interpreting, or execution of invisible Trojan source code. This suppression of invisible Trojan source code can reduce vulnerabilities caused by these types of source code. In addition to source code compiler 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and source code compiler 190, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in source code compiler 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in source code compiler 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, the illustrative embodiments recognize and take into account that the Trojan source vulnerability can be especially risky for browsers that display text using the bidirectional algorithm in Unicode. This vulnerability is a type of attack that cannot be perceived directly by a human user reviewing source code that has been rendered for display on a display device. This vulnerability can result in the introduction of harmful functions, the removal of safeguards, or both.

Identifying Trojan source code within the source code is difficult for a user visually reviewing the source code. In attempting to identify Trojan source code, a user can manually run a tool to search for control characters. The user needs to have knowledge about the layout of control characters in Unicode. Further, after finding these control characters, the user needs to find and review the related source code associated with the control characters and determine whether the related code is malicious source code. These steps require the user to have knowledge of the Unicode layout algorithm and have globalization skills. This type of process is time-consuming and error-prone and relies upon the skill and knowledge of the particular user reviewing the source code.

As a result, the presence of invisible Trojan source code can be missed by users creating and reviewing the source code. It would be desirable to have a method, apparatus, system, and computer program product that can automatically scan and suppress Trojan source code at compile time to generate a Trojan code free executable binary code. Thus, the illustrative embodiments provide a method, apparatus, system, and computer program product for compiling source code. In one example, a computer implemented method compiles a source code. A computer system loads the source code into a first memory. The computer system loads a rendered source code into a second memory, wherein the rendered source code is a rendered version of the source code. The computer system determines whether a difference is present between the source code in the first memory and the rendered source code in the second memory. The computer system performs a set of actions in compiling the source code in response to determining that the difference between the source code and the rendered source code is present.

Figure 2:
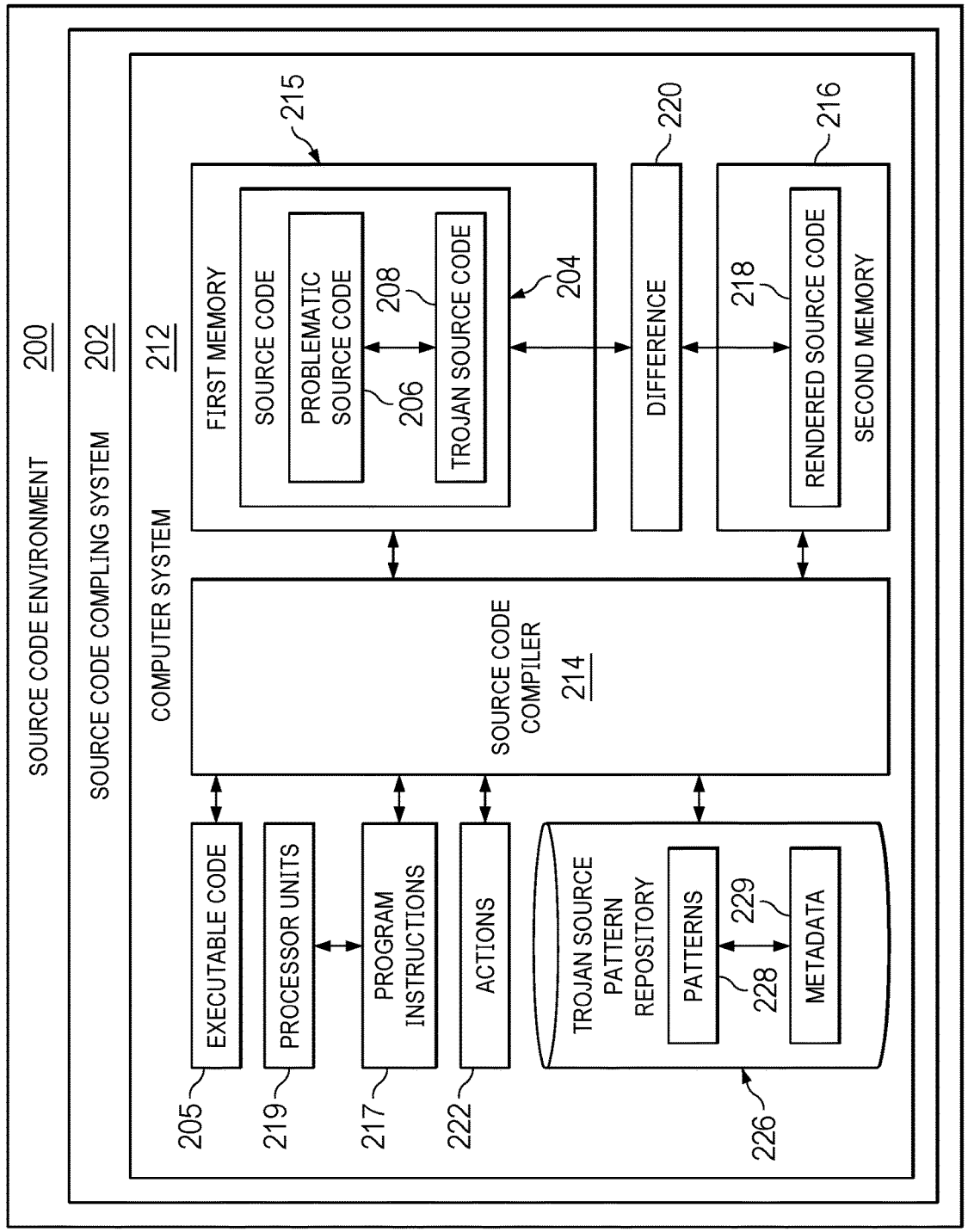
FIG. 2 is a block diagram of a source code environment in accordance with an illustrative embodiment.

With reference now to FIG. 2, a block diagram of a source code environment is depicted in accordance with an illustrative embodiment. In this illustrative example, source code environment 200 includes components that can be implemented in hardware such as the hardware shown for computing environment 100 in FIG. 1.

In this illustrative example, source code environment 200 includes components that can be implemented in hardware such as the hardware shown in computing environment 100 in FIG. 1. As depicted, source code compiler 214 in source code compiling system 202 in source code environment 200 can compile source code 204 to form executable code 205. In this example, source code 204 is code written using a human readable programming language and is usually in plain text. Source code 204 can be, for example, C, C++, Java, Javascript or other languages that are human readable.

Executable code 205 is in a form that is executable by the computer. For example, executable code 205 can be an executable machine code.

In the depicted example, source code compiler 214 is a computer program that compiles computer code by translating the computer code written in one programming language, a source language, into another language, a target language. Source code compiler 214 complies source code 204 by translating source code 204 from a high-level programming language to a lower-level language to create executable code 205. The high level programming language can be a human readable programming language. The lower level programming language can be, for example, assembly language, object code, bytecodes, or machine code, or other suitable type of code.

In this example, problematic source code 206 can be control symbols that modify the display of source code for a process. The process can be, for example, a function or a subroutine. Problematic source code 206 can be a portion of or all of the source code 204 that is being compiled by source code compiler 214 in this example. For example, source code 204 can be a portion of the program that is being compiled by source code compiler 214.

These control symbols control a display of text, but these control symbols are not displayed when source code 204 is rendered. In this example, problematic source code 206 can modify text or characters that are displayed using a bidirectional algorithm.

In one illustrative example, the control symbols comprise problematic source code 206. The control symbols can be control characters defined in Unicode. In another example, problematic source code 206 can be the control symbols and the related source code that is modified by the control symbols.

Problematic source code 206 can be Trojan source code 208. In other cases, problematic source code 206 can be for legitimate functions such as displaying characters in different languages in a desired manner.

For example, problematic source code 206 can include control characters that results in a function for compiling and executing code that is not rendered for display to a user. As a result, a function can be included although the function is not intended for use in source code 204. This result occurs because the user does not see the source code for the function.

As another example, the control characters can result in a display of text that looks like source code for a function in source code 204. However, this function is not actually present in source code 204 when source code 204 is compiled into executable code 205 for execution. As a result, important functions such as verifying whether a user is authorized to access a resource can appear to be present but is omitted when source code 204 is compiled and executed. This check can be performed using source code compiler 214 as part of compiling source code 204.

As a result, problematic source code 206 can be missed during review of source code 204 and can be compiled resulting in undesired program execution. In this illustrative example, source code compiling system 202 can operate to suppress Trojan source code 208 in source code 204 as part of the process of compiling source code 204. In this illustrative example, source code compiling system 202 contains a number of different components. As depicted, source code compiling system 202 comprises computer system 212 and source code compiler 214. Source code compiler 214 is located in computer system 212. Source code compiler 214 is an example of source code compiler 190 in FIG. 1.

Source code compiler 214 can be implemented in software, hardware, firmware or a combination thereof. When software is used, the operations performed by source code compiler 214 can be implemented in program instructions configured to run on hardware, such as a processor unit. When firmware is used, the operations performed by source code compiler 214 can be implemented in program instructions and data and stored in persistent memory to run on a processor unit. When hardware is employed, the hardware can include circuits that operate to perform the operations in source code compiler 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 219 that are capable of executing program instructions 217 implementing processes in the illustrative examples. In other words, program instructions 217 are computer readable program instructions.

As used herein, a processor unit in the number of processor units 219 is a hardware device and is comprised of hardware circuits such as those on an integrated circuit that respond to and process instructions and program instructions that operate a computer. A processor unit can be implemented using processor set 110 in FIG. 1. When the number of processor units 219 execute program instructions 217 for a process, the number of processor units 219 can be one or more processor units that are on the same computer or on different computers. In other words, the process can be distributed between processor units 219 on the same or different computers in computer system 212. Further, the number of processor units 219 can be of the same type or different type of processor units. For example, the number of processor units 219 can be selected from at least one of a single core processor, a dual-core processor, a multi-processor core, a general-purpose central processing unit (CPU), a graphics processing unit (GPU), a digital signal processor (DSP), or some other type of processor unit.

In suppressing Trojan source code 208, source code compiler 214 can analyze source code 204 to determine how to compile source code 204 in a manner that avoids including Trojan source code 208. In this illustrative example, the analysis of source code 204 can be performed prior to compiling source code 204 to form executable code 205. In other illustrative examples, the analysis can be performed while source code 204 is being compiled to form executable code 205. In other words, source code compiler 214 can analyze a portion of source code 204 to determine that the portion of source code 204 potentially has Trojan source code 208 that should be suppressed.

In this illustrative example, source code compiler 214 loads source code 204 into first memory 215. Source code compiler 214 loads rendered source code 218 into second memory 216. In this example, rendered source code 218 is a rendered version of source code 204. These memories can be temporary memories in the form of memory buffers.

Rendered source code 218 is a form of source code 204 that is processed for display to user. For example, different control characters can be used in the rendering process to generate the rendered version of source code 204. These control characters may provide instructions on how various characters or symbols should be displayed.

Source code compiler 214 determines whether difference 220 is present between source code 204 in first memory 215 and rendered source code 218 in second memory 216. Source code compiler 214 performs a set of actions 222 in compiling source code 204 in response to determining that difference 220 between source code 204 and rendered source code 218 is present.

As used herein, a "set of" when used with reference items means one or more items. For example, a set of actions 222 is one or more of actions 222.

The set of actions 222 can include, for example, generating an alert and hold code compiling of source code 204, generate an alert and compile source code 204 without suppressing problematic source code 206 or Trojan source code 208, compile source code 204 that suppresses problematic source code 206 or Trojan source code 208 by use of the rendered version of source code 204, which is rendered source code 218, and other suitable actions. These actions can be, for example, based on user options selected prior to compiling source code 204 or selected in response to a prompt during compiling of source code 204.

In performing the set of actions 222, source code compiler 214 can compile rendered source code 218 in second memory 216 in place of source code 204 in first memory 215 in response to difference 220 being present between source code 204 and rendered source code 218. In this example, when difference 220 is present an action of using rendered source code 218 for compiling in place of source code 204 is taken. This action does not include any analysis as to whether problematic source code 206 is present or whether problematic source code 206 can be Trojan source code 208. For example, this action can be taken when source code 204 has a high level of importance or security.

In another illustrative example, in performing the set of actions 222, source code compiler 214 can determine whether problematic source code 206 is present in source code 204. Source code compiler 214 can determine whether problematic source code 206 is present in Trojan source pattern repository 226 in response to problematic source code 206 being present in source code 204. In this example, Trojan source pattern repository 226 contains patterns 228 identifying problematic source code that is Trojan source code. Problematic source code 206 can be compared to patterns 228 to determine whether problematic source code 206 is Trojan source code 208 based on patterns 228 for known Trojan source code.

In this depicted example, a pattern in patterns 228 can uniquely identify Trojan source code. The pattern can contain a portion or all of problematic source code 206. The pattern can be considered a fingerprint for the Trojan source code.

In this illustrative example, patterns 228 can also be associated with metadata 229. Metadata 229 can provide information used to determine the set of actions 222 in compiling source code 204. For example, metadata 229 can include information such as severity score, impact level, risk type, and other suitable formation. Metadata 229 can be a subset or summarized information. Source code compiler 214 can determine the set of actions 222 based on a result of searching Trojan source pattern repository 226.

Source code compiler 214 compiles rendered source code 218 in place of source code 204 in response to problematic source code 206 being present in source code 204 and being present in Trojan source pattern repository 226.

As another example, in performing the set of actions 222, source code compiler 214 determines whether problematic source code 206 is present in source code 204. Source code compiler 214 compiles rendered source code 218 in place of source code 204 in response to problematic source code 206 being present in source code 204.

In this case, source code compiler 214 compiles rendered source code 218 when problematic source code 206 is present without searching Trojan source pattern repository 226 to determine whether problematic source code 206 is Trojan source code 208. This approach is between compiling rendered source code 218 whenever any difference is present and checking to see whether problematic source code is Trojan source code 208 based on searching Trojan source pattern repository 226. This approach can be taken when extra precautions are desired. For example, this approach can avoid situations in which Trojan source pattern repository 226 does not have a pattern that indicates problematic source code 206 is Trojan source code 208 even though problematic source code 206 is actually a Trojan source code that should not be compiled.

Thus, source code compiler 214 can operate as an anti-Trojan compiler that can intelligently suppress Trojan code during compiling of source code. As a result, source code compiler 214 can produce Trojan code free executable binary application code.

In one illustrative example, one or more solutions are present that overcome a problem with compiling source code that includes invisible code such as control characters in Unicode. In the illustrative example, a programmer or other reviewer of the source code may miss the fact that the display of the source code is not what is actually compiled and executed. In one illustrative example, the source code compiler can detect problematic source code or Trojan source code such as invisible Trojan source code prior to compiling the source code. Source code compiler 214 in the different illustrative examples can suppress the problematic source code or Trojan source code. The suppression can be performed by using the rendered version of the source code in the rendering buffer. By compiling the rendered source code, compiled code can function as seen and intended by a user developing or reviewing the source code. As a result, one or more solutions may provide an ability to increase protection of hardware systems, software, and data.

Computer system 212 can be configured to perform at least one of the steps, operations, or actions described in the different illustrative examples using software, hardware, firmware or a combination thereof. As a result, computer system 212 operates as a special purpose computer system in which source code compiler 214 in computer system 212 enables suppressing Trojan source code at compile time. As a result, the use of source code compiler 214 can increase the protection against problematic source code source code that can include Trojan source code. In particular, source code compiler 214 transforms computer system 212 into a special purpose computer system as compared to currently available general computer systems that do not have source code compiler 214.

In the illustrative example, the use of source code compiler 214 in computer system 212 integrates processes into a practical application for compiling source code in a manner that increases the performance of computer system 212. In other words, source code compiler 214 in computer system 212 is directed to a practical application of processes integrated into source code compiler 214 in computer system 212 which suppresses the compiling of invisible Trojan source code. In this illustrative example, source code compiler 214 in computer system 212 compares the source code with a rendered version of the source code typically used for display. In response to a difference being present, the process determines whether problematic source code is present and can also determine whether the problematic source code is Trojan source code. Based on the different determinations and user options, the compiling can be performed using the rendered source code in place of the source code such that the Trojan source code is suppressed. As a result, improvement in computer system 212 is improved because the execution of can be reduced increasing security of computer system 212.

The illustration of source code environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, source code compiler 214 can search one or more Trojan source pattern repositories in addition to or in place of Trojan source pattern repository 226. Source code 204 can be a program, a module, a plug-in, a library, or other source code that can be compiled to form executable code 205. In another illustrative example, source code compiler 214 can be a pre-compiler for another compiler. With this example, source code compiler 214 can analyze source code 204 and suppress Trojan source code 208 and direct compiling of source code 204 by the final compiler based on the analysis.

Figure 3:
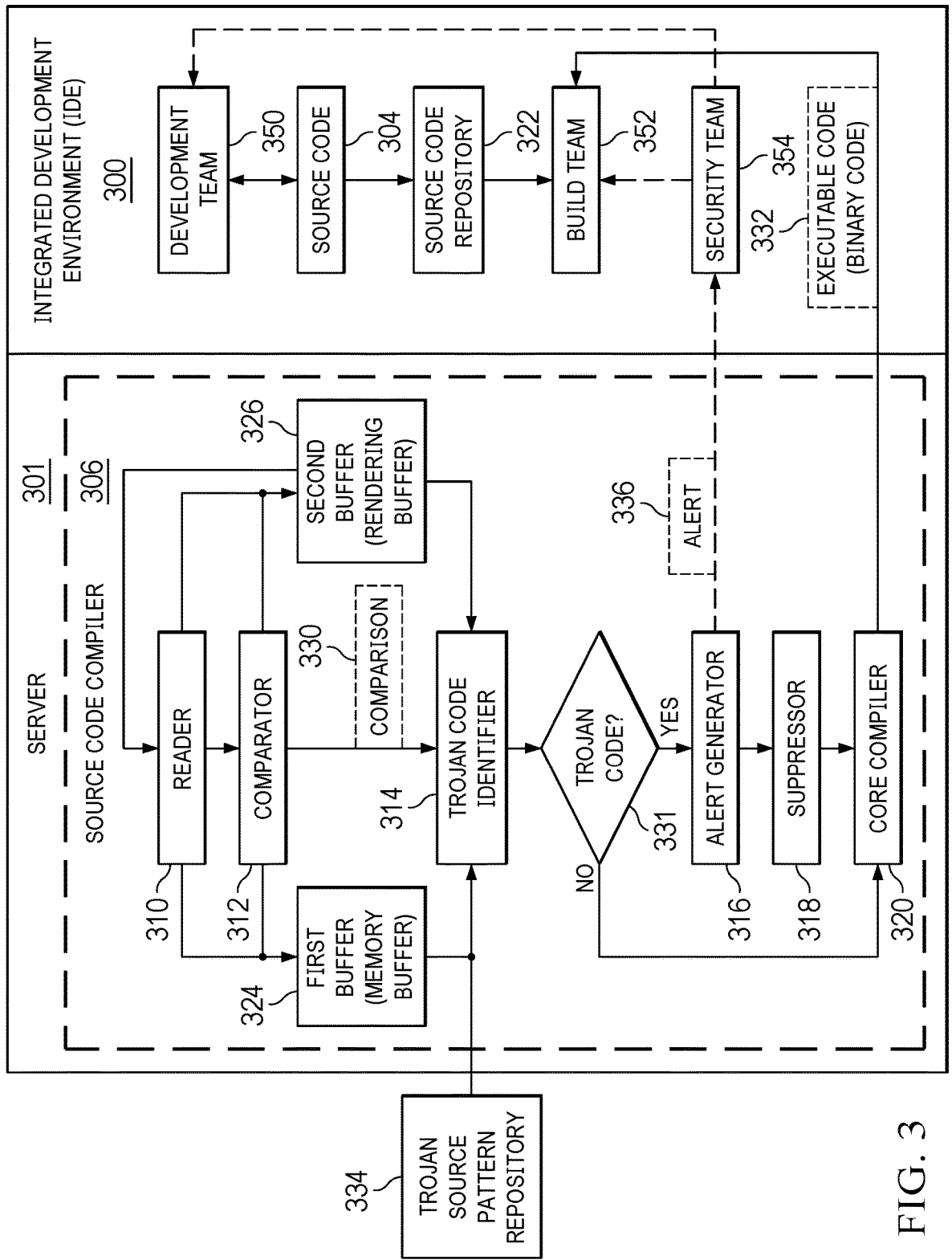
FIG. 3 is a block diagram illustrating detection of problematic source code in accordance with an illustrative embodiment.

With reference to FIG. 3, a block diagram illustrating detection of problematic source code is depicted in accordance with an illustrative embodiment. In this depicted example, integrated development environment 300 is an environment for developing source code 304. Source code compiler 306 in server 301 provides an ability to identify Trojan source code that may be hidden or missed by development team 350 or build team 352 working on source code 304.

Server 301 can be located in source code compiling system 202 in FIG. 2 and can analyze source code 304 to determine whether problematic source code is present. Server 301 is software in this example and can run on hardware such as computer system 212 in FIG. 2.

In this example, source code compiler 306 in server 301 is an example of an implementation of source code compiler 214 in FIG. 2. As depicted in this example, source code compiler 306 includes reader 310, comparator 312. Trojan code identifier 314, alert generator 316, suppressor 318, and core compiler 320.

In this illustrative example, reader 310 can read source code 304 from source code repository 322 in integrated development environment 300. In this example, reader 310 places source code 304 into first buffer 324. First buffer 324 is a memory buffer in this example. As depicted, reader 310 also places source code 304 into second buffer 326 which is a rendering buffer. In this example, reader 310 can render source code 304 into a rendered source code that is placed into second buffer 326. In other illustrative examples, the placement of source code 304 into second buffer 326 results in source code 304 being rendered to form rendered source code.

Comparator 312 compares the source code in first buffer 324 with the rendered source code in second buffer 326 to form comparison 330. The comparison can identify differences between the source code and the rendered source code. In some cases, comparison 330 may indicate that a difference between the two source codes is absent. Trojan code identifier 314 uses comparison 330 to determine whether Trojan source code is present (step 331). If a difference is not present between the two source codes, then Trojan source code is not present and the source code in first buffer 324 is compiled by core compiler 320 to form executable code 332. This executable code is a binary code in this example and is sent to build team 352.

If the difference is present. Trojan code identifier 314 can determine whether problematic source code is present and can use Trojan source pattern repository 334 to determine whether the problematic source code is Trojan source code. If Trojan source code is present, then Trojan code identifier initiates alert generator 316 to send alert 336. In this example, alert 336 is sent to at least one of security team 354, build team 352 or development team 350 as shown by the dashed lines.

Additionally, suppressor 318 can suppress the Trojan code in the source code in first buffer 324. This suppression can be performed by compiling the rendered source code in second buffer 326 to form executable code 332.

In this example, the handling of the detection of Trojan source code to generate an alert 336 and suppressing the Trojan source code in compiling the source code is an example of one manner in which source code compiler 306 can operate. Depending on user options, other actions can be taken in response to detection of Trojan source code.

For example, alert 336 can be generated and compiling of the source code can be placed on hold. In another example, alert 336 and the compiling of the source code can be performed using the source code in first buffer 324 such that suppression of the Trojan source code does not occur. This scenario may be used when the code is being run in a protected environment to observe the behavior of Trojan source code. In other illustrative examples, the rendered source code can be used when any difference is present between the source code in the rendered source code. In yet another illustrative example, the rendered source code can be used when problematic source code is detected but the problematic source code is not identified as Trojan source code from searching Trojan source pattern repository 334. These and other options can be implemented in the handling of source code by source code compiler 306.

Figure 4:
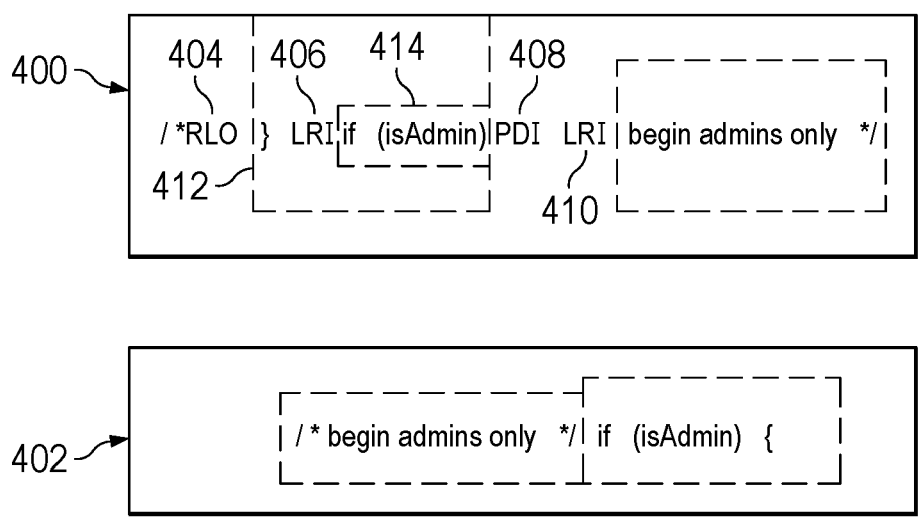
FIG. 4 is an illustration of source code and rendered source code in accordance with an illustrative embodiment.

With reference now to FIG. 4, an illustration of source code and rendered source code is depicted in accordance with an illustrative embodiment. As depicted, source code 400 can be rendered to form rendered source code 402. Rendered source code 402 is a version of source code 400 that can be displayed on a display device.

In this illustrative example, control characters are present that can be processed during rendering of source code 400 to generate rendered source code 402. For example, Right2Left Override 404, Left2Right Isolate 406, POP Directional Isolate 408, and Left2Right Isolate 410 are present in source code 400. These control characters change source code 400 to a different form for display when rendered to form rendered source code 402.

As depicted, this entire line for source code 400 is a comment. Rendered source code 402 shows that a subroutine is executed. As a result, compiling source code 400 does not implement the subroutine seen in rendered source code 402.

As depicted, invisible rendering logic is present and is problematic source code 412, which is an example of problematic source code 206 in FIG. 2. As depicted, problematic source code 412 that is altered for display as a comment using Right2Left Override 404, Left2Right Isolate 406, POP Directional Isolate 408, and Left2Right Isolate 410. In this example, these control characters are Unicode control characters.

As depicted, "begin admins only" in rendered source code 402 is shown as a comment and "if(isAdmin) {" is shown as code that will be compiled. As depicted, this entire line for source code 400 is a comment rather than including a subroutine is compiled as shown in rendered source code 402. As a result, compiling source code 400 does not implement the subroutine seen in rendered source code 402.

The source code compiler in these illustrative examples can compare source code 400 to rendered source code 402 to identify invisible Trojan source code during the compiling process. In this example, subroutine 414 is present in problematic source code 412 as a comment and is not compiled as shown in rendered source code 402.

In this example, a search of a Trojan source pattern repository can be made to determine whether problematic source code 206 is a Trojan source code. If problematic source code 412 is Trojan source code, then the source code can be compiled using rendered source code 402 instead of source code 400. The same type of suppression can be performed when problematic source code 412 is present but is not identified as Trojan source code from searching repository.

Figure 5A:
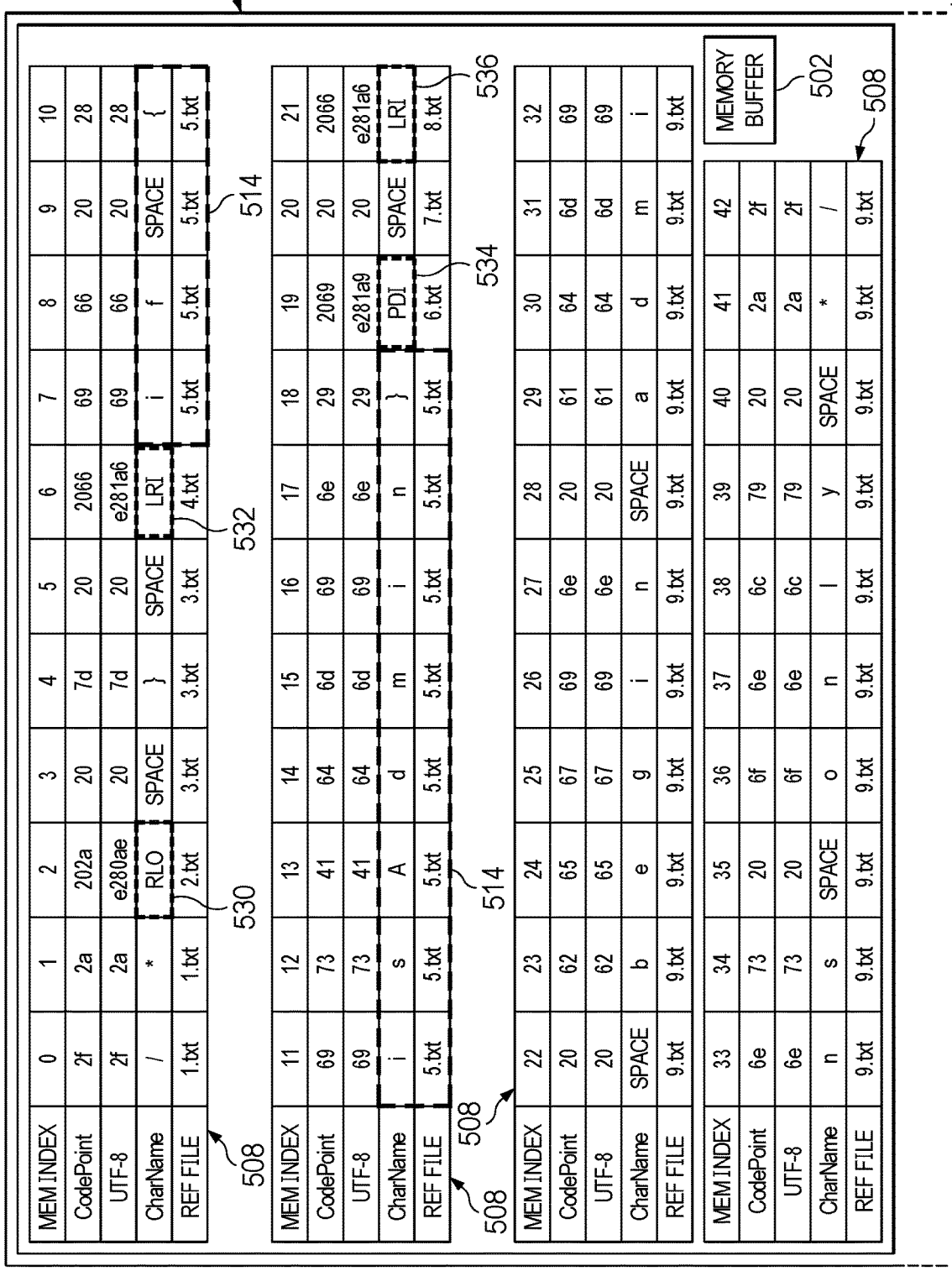
FIGS. 5A and 5B are a diagram of memory buffers used to detect problematic source code in accordance with an illustrative embodiment.
Figure 5B:
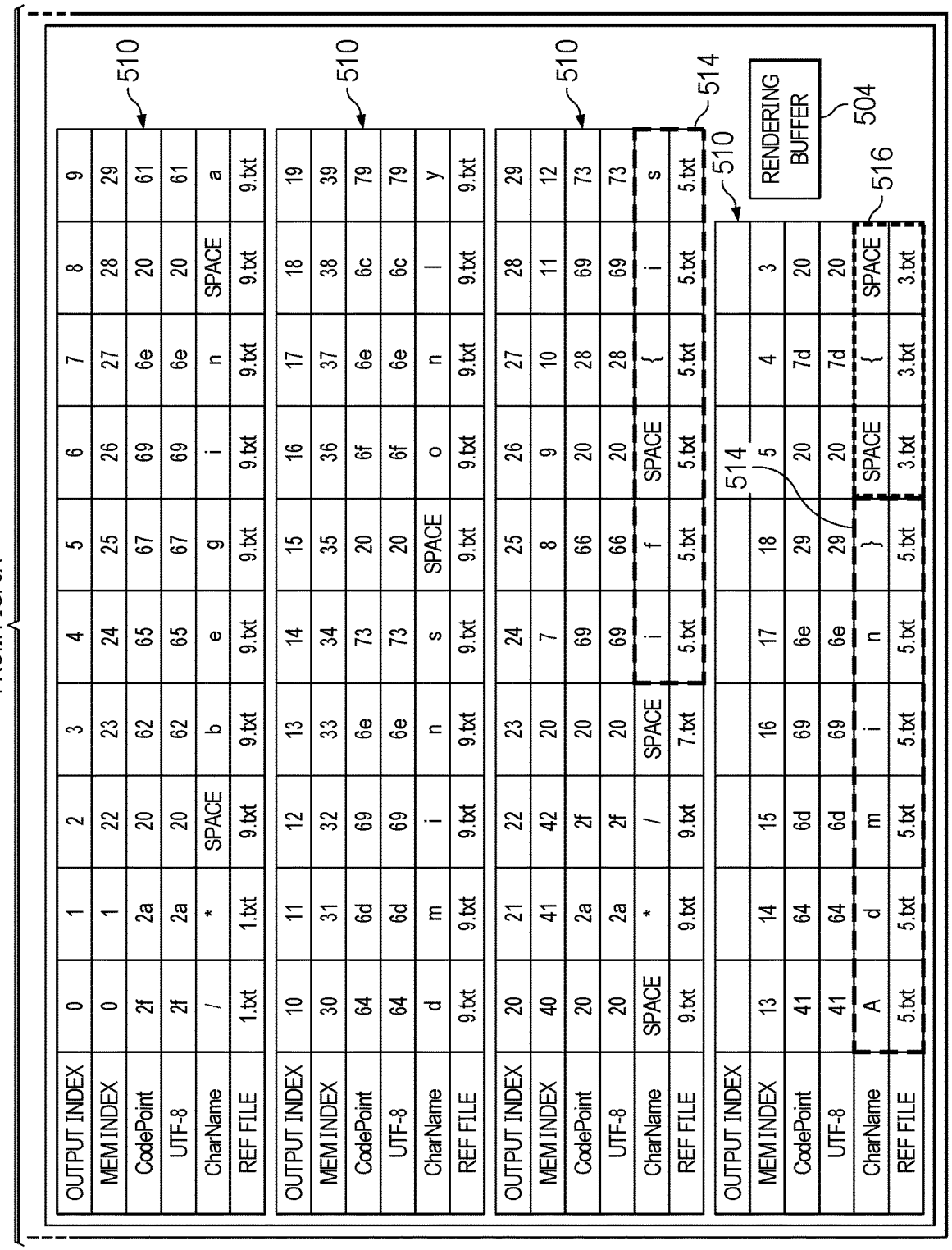

With reference to FIGS. 5A and 5B, a diagram of memory buffers used to detect problematic source code is depicted in accordance with an illustrative embodiment. In this illustrative example, buffers 500 comprise memory buffer 502 and rendering buffer 504. In this depicted example, memory buffer 502 is an example of an implementation for first memory 215 in FIG. 2 and rendering buffer 504 is an example of an implementation for second memory 216 in FIG. 2.

As depicted in this example, source code 508 is located in memory buffer 502 and rendered source code 510 is located in rendering buffer 504. Rendered source code 510 is a form of source code 508 rendered for display to a user. Source code 508 is an example of source code 400 in FIG. 4 placed in memory buffer 502 and rendered source code 510 is an example of rendered source code 402 in FIG. 4 placed in rendering buffer 504.

In this example, control characters are present in source code 508. As depicted the control characters are RLO 530, LRI 532, PDI 534, and LRI 536. In this example, RLO 530 corresponds to Right2Left Override 404 in FIG. 4, LRI 532 corresponds to Left2Right Isolate 406 in FIG. 4, PDI 534 corresponds to POP Directional Isolate 408 in FIG. 4, and LRI 536 corresponds to Left2Right Isolate 410 in FIG. 4. These control characters are not located in rendered source code 510 in rendering buffer 504 because these control characters are not displayed.

As depicted, the control characters affect text 514 in rendered source code 510. More specifically, the control characters affect how text 514 is displayed. In this example, text 514 is for a subroutine. In other examples the text can be for a process such as a function or subroutine.

In this example, text 514 in rendered source code 510 in rendering buffer 504 is displayed as code for a subroutine that can be compiled and executed. In other words, text 514 appears to be source code that can be compiled and executed when rendered source code 510 is displayed. In this example, text 516 appears to be the comments that were located after text 514.

However, in source code 508, text 514 is actually part of comments rather than actual source code for a process that can be compiled and executed. The control characters change text 514 to appear to be source code for a subroutine represented by text 514 that can be in rendered source code 510. As a result, the user does not see that text 514 is actually part of a set of comments rather than actual source code for the function or subroutine.

In this illustrative example, rendered source code 510 is the source code that is reviewed and approved by the user. In response to the source code compiler determining that a difference is present between source code 508 and rendered source code 510, the source code compiler can use rendered source code 510 in place of source code 508 such that the subroutine will actually be compiled and executed.

In this illustrative example, the illustration of source code in buffers is depicted as an example and not meant to limit the manner in which other illustrative examples can be implemented. For example, in another illustrative example text can be present in source code for a function that will be executed. The text for this function, however, shows up as comments when the source code containing the text is rendered to form rendered source code for display. As a result, processes such as functions or subroutines can be added that are not expected by user from reviewing the rendered source code.

Figure 6:
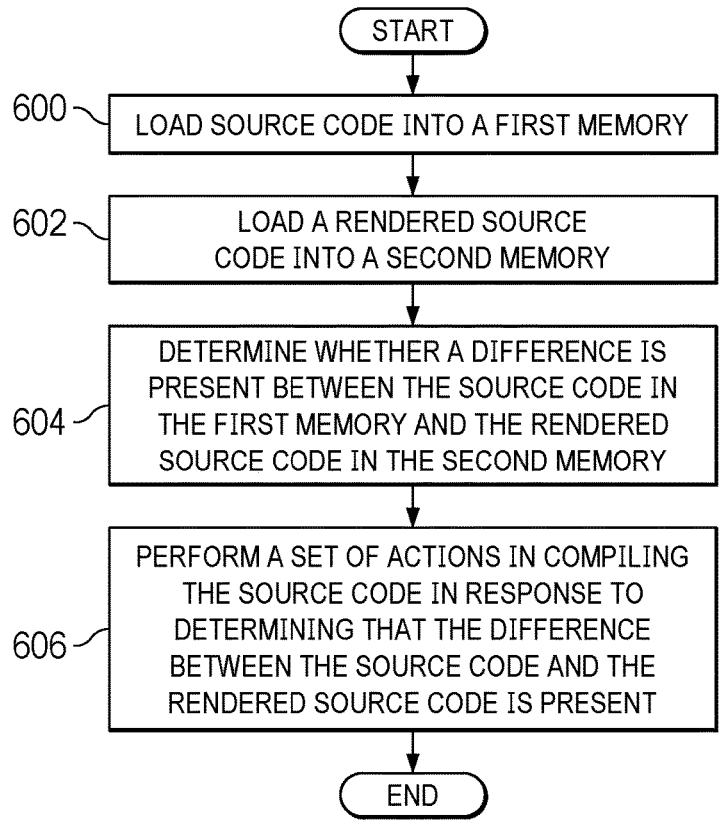
FIG. 6 is a flowchart of a process for compiling source code in accordance with an illustrative embodiment.

Turning next to FIG. 6, a flowchart of a process for compiling source code is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. For example, the process can be implemented in source code compiler 214 in computer system 212 in FIG. 2.

The process begins by loading source code into a first memory (step 600). The process loads a rendered source code into a second memory (step 602). In step 602, the rendered source code is a rendered version of the source code. The process determines whether a difference is present between the source code in the first memory and the rendered source code in the second memory (step 604).

The process performs a set of actions in compiling the source code in response to determining that the difference between the source code and the rendered source code is present (step 606). The process terminates thereafter.

Figure 7:
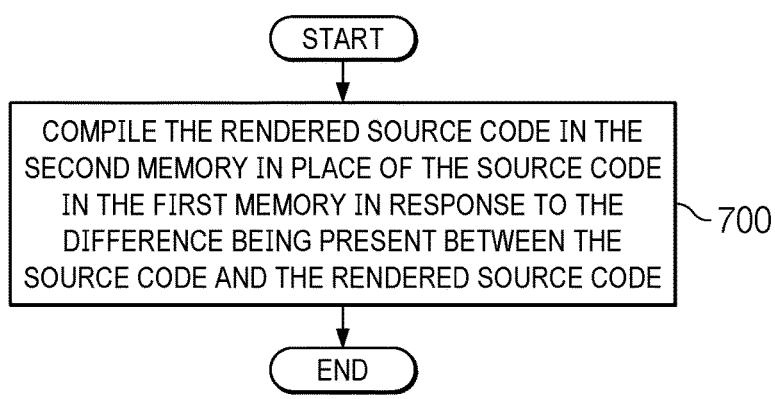
FIG. 7 is a flowchart of a process for performing a set of actions in accordance with an illustrative embodiment.

With reference next to FIG. 7, a flowchart of a process for performing a set of actions is depicted in accordance with an illustrative embodiment. The process in FIG. 7 is an example of one implementation for step 606 in FIG. 6.

The process compiles the rendered source code in the second memory in place of the source code in the first memory in response to the difference being present between the source code and the rendered source code (step 700). The process terminates thereafter.

Figure 8:
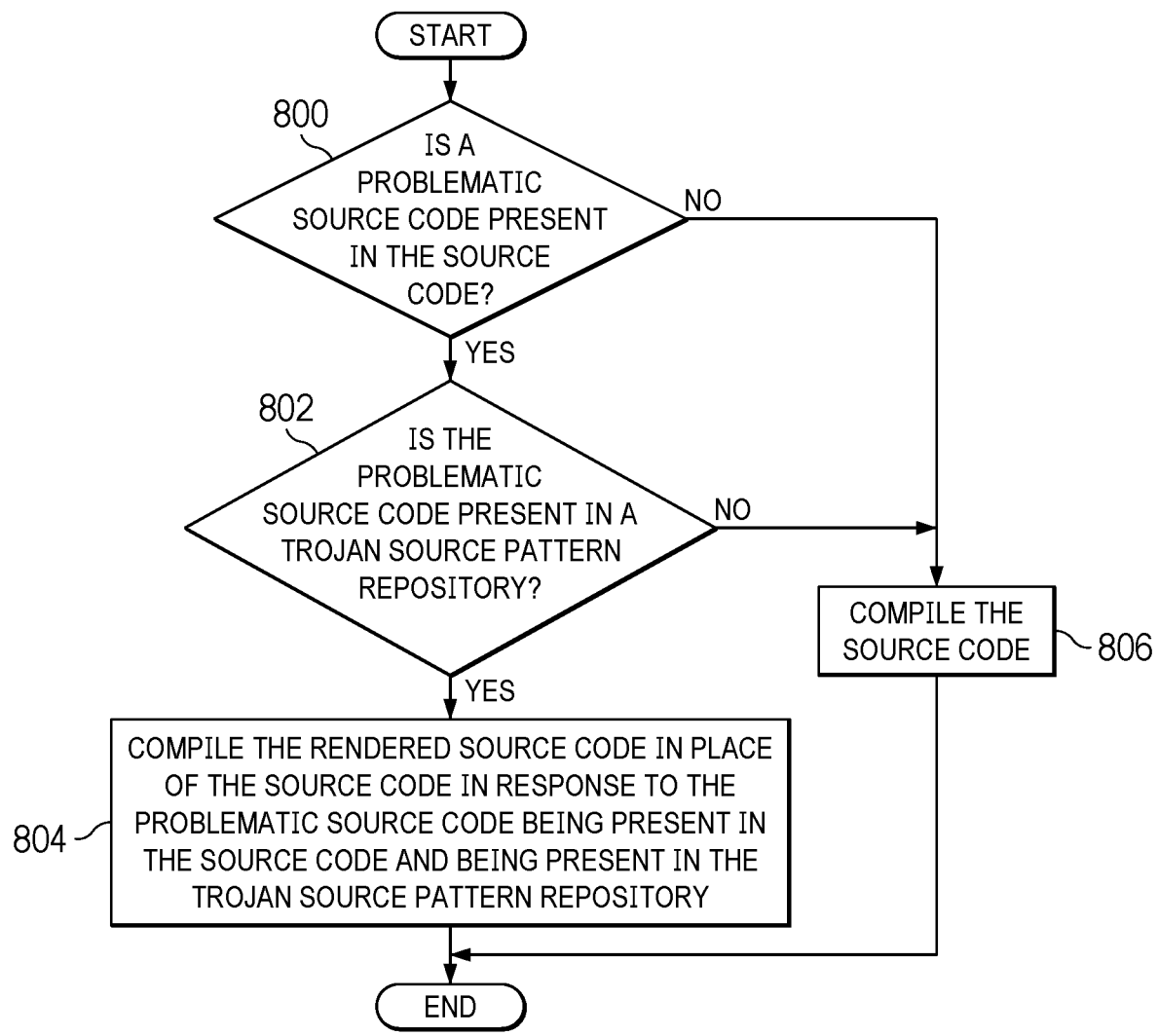
FIG. 8 is a flowchart of a process for performing a set of actions in accordance with an illustrative embodiment.

In FIG. 8, a flowchart of a process for performing a set of actions is depicted in accordance with an illustrative embodiment. The process in FIG. 8 is an is an example of one implementation for step 606 in FIG. 6.

The process begins by determining whether a problematic source code is present in the source code (step 800). In response to the problematic source code being present in the source code, the process determines whether the problematic source code is present in a Trojan source pattern repository (step 802).

The process compiles the rendered source code in place of the source code in response to the problematic source code being present in the source code and being present in the Trojan source pattern repository (step 804). The process terminates thereafter.

With reference again to step 802, if the problematic source code is not present in the Trojan source pattern repository, the process compiles the source code (step 806). The process terminates thereafter. With reference again to step 800, if the problematic source code is not present, the process proceeds to step 806.

Figure 9:
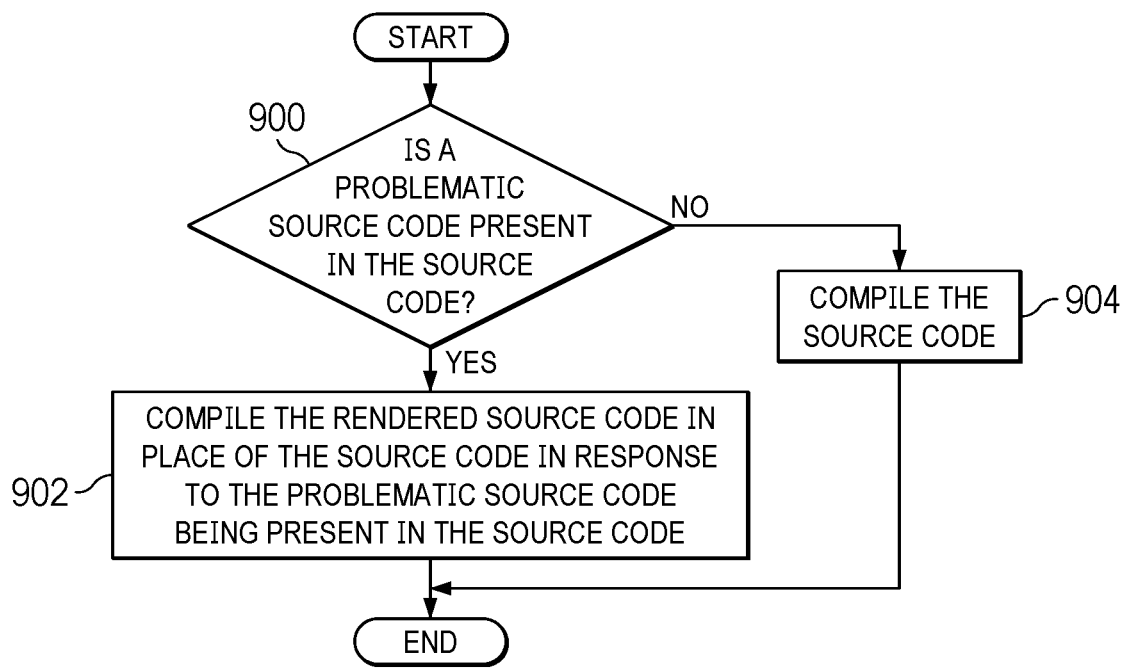
FIG. 9 is a flowchart of a process for performing a set of actions in accordance with an illustrative embodiment.

Turning now to FIG. 9, a flowchart of a process for performing a set of actions is depicted in accordance with an illustrative embodiment. The process in FIG. 9 is an example of one implementation for step 606 in FIG. 6.

The process begins by determining whether a problematic source code is present in the source code (step 900). If the problematic source code is present, the process compiles the rendered source code in place of the source code in response to the problematic source code being present in the source code (step 902). The process terminates thereafter.

With reference again to step 900, if the problematic source code is not present, the process compiles the source code (step 904). The process terminates thereafter.

Figure 10:
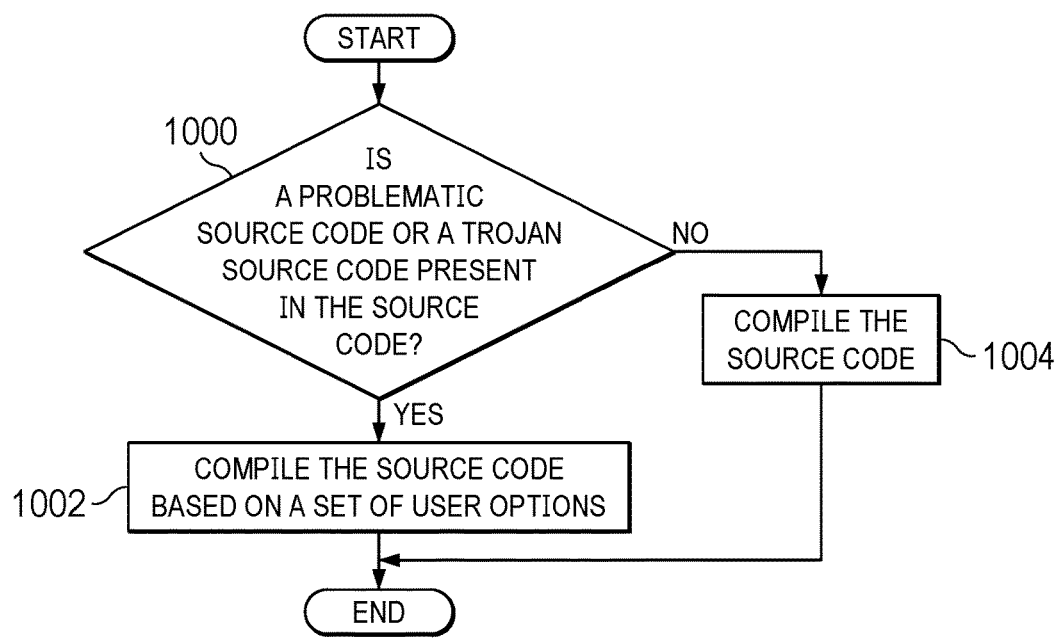
FIG. 10 is a flowchart of a process for performing a set of actions in accordance with an illustrative embodiment.

With reference next to FIG. 10, a flowchart of a process for performing a set of actions is depicted in accordance with an illustrative embodiment. The process in FIG. 10 is an is an example of one implementation for step 606 in FIG. 6.

The process begins by determining whether a problematic source code or a Trojan source code is present in the source code (step 1000). If the problematic source code or the Trojan source code is present, the process compiles the source code based on a set of user options (step 1002). The process terminates thereafter. In step 1002, the user options can be selected from at least one of generating an alert and hold code compiling of the source code, generate an alert and compile the source code in the memory buffer without suppressing problematic source code or Trojan source code, compile the source code suppressing problematic source code or Trojan source code by compiling the rendered source code in the rendering buffer, and other suitable actions.

With reference again to step 1000, if the problematic source code or the Trojan source code is not present, the process compiles the source code (step 1004). The process terminates thereafter.

Figure 11:
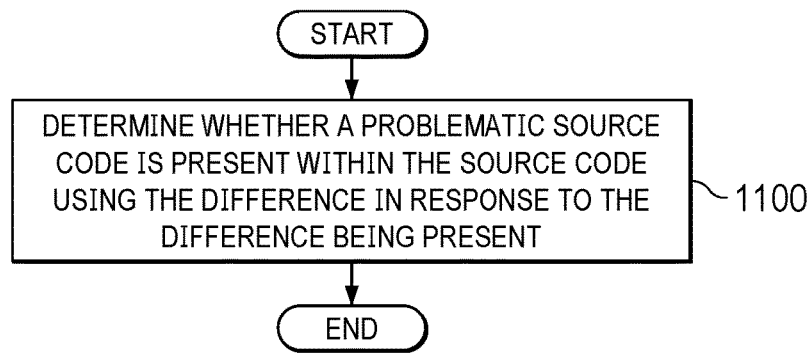
FIG. 11 is a flowchart of a process for determining a presence of problematic source code in accordance with an illustrative embodiment.

With reference to FIG. 11, a flowchart of a process for determining a presence of problematic source code is depicted in accordance with an illustrative embodiment. The process in FIG. 11 is an example of an additional step that can be performed with the steps in FIG. 6.

The process determines whether a problematic source code is present within the source code using the difference in response to the difference being present (step 1100). The process terminates thereafter. In step 1100, the problematic source code can be a process modified by control symbols controlling a display of text using a bidirectional algorithm. This process can be, for example, one of a function and a subroutine.

Figure 12:
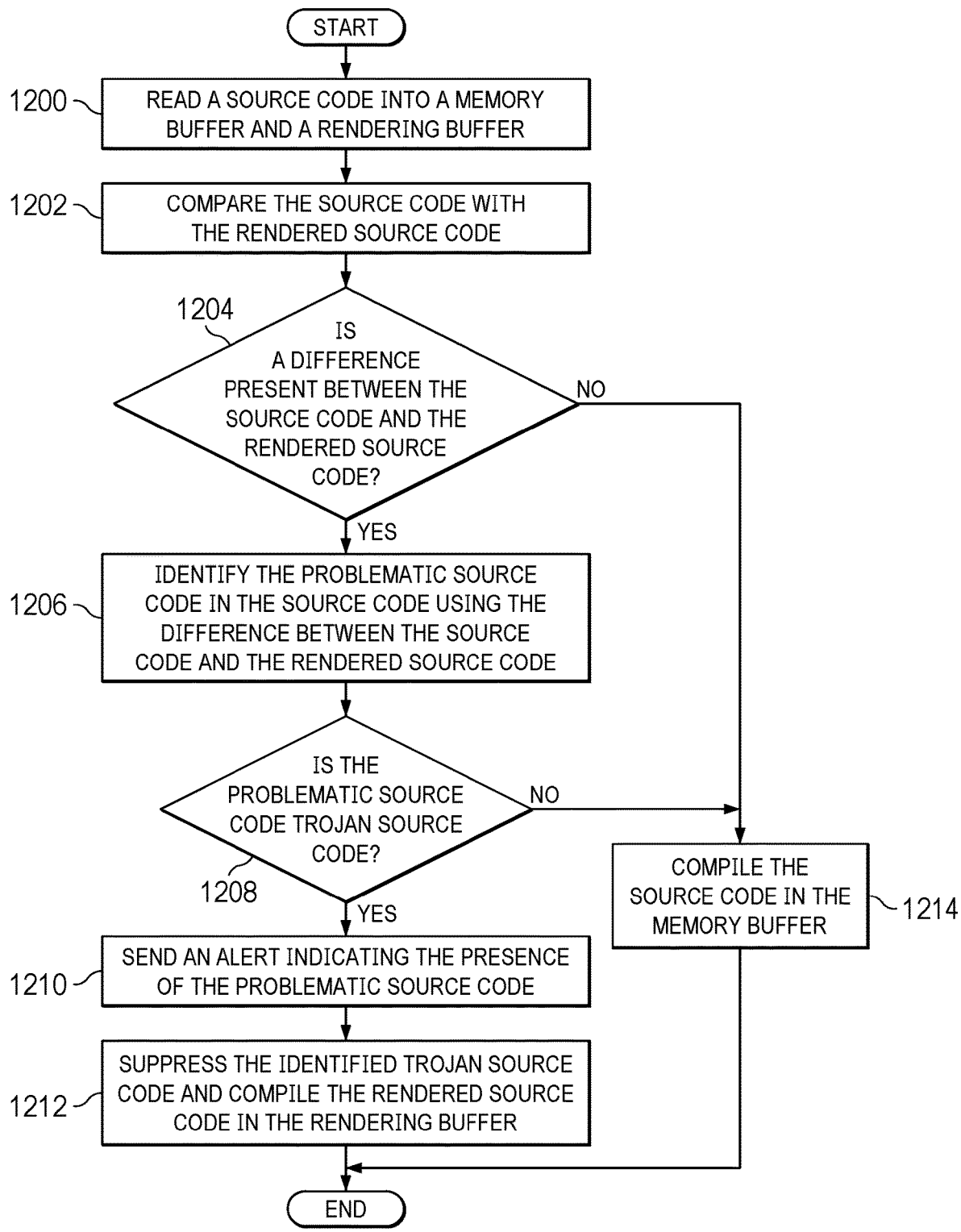
FIG. 12 is a flowchart of a process for compiling a source code in accordance with an illustrative embodiment.

Turning to FIG. 12, a flowchart of a process for compiling a source code is depicted in accordance with an illustrative embodiment. The process in FIG. 12 can be implemented in hardware, software, or both. When implemented in software, the process can take the form of program instructions that is run by one of more processor units located in one or more hardware devices in one or more computer systems. For example, the process can be implemented in source code compiler 214 in computer system 212 in FIG. 2.

The process begins by reading a source code into a memory buffer and a rendering buffer (step 1200). In step 1200, the source code is rendered to form rendered source code that is placed into the rendering buffer.

The process compares the source code with the rendered source code (step 1202). The process determines whether a difference is present between the source code and the rendered source code (step 1204). If a difference is present, the process identifies the problematic source code in the source code using the difference between the source code and the rendered source code (step 1206). In step 1206, the process assumes that any difference between the source code in the rendered source code includes problematic source code.

The process determines whether the problematic source code is Trojan source code (step 1208). This determination can be made in a number of different ways. For example, a Trojan source pattern repository can be searched to determine whether the problematic source code has been identified as Trojan source code. This repository can be a local pattern repository, a trusted third-party malware repository, or some other suitable source.

If the problematic source code is identified as Trojan source code, the process sends an alert indicating the presence of the problematic source code (step 1210). In step 1210, the alert can be a text message, a chat message, and email, or some other suitable type of alert. The alert can be sent to one or more entities selected from at least one of as an application build team, a security administrator, a cybersecurity organization, or other suitable entity.

The process suppresses the identified Trojan source code and compiles the rendered source code in the rendering buffer (step 1212). The process terminates thereafter. With reference again to step 1208, if the problematic source code is not identified as Trojan source code, the process compiles the source code in the memory buffer (step 1214). Turning back to step 1204, if a difference is not present between the source code and the rendered source code, the process compiles the source code in the memory buffer (step 1214). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 13:
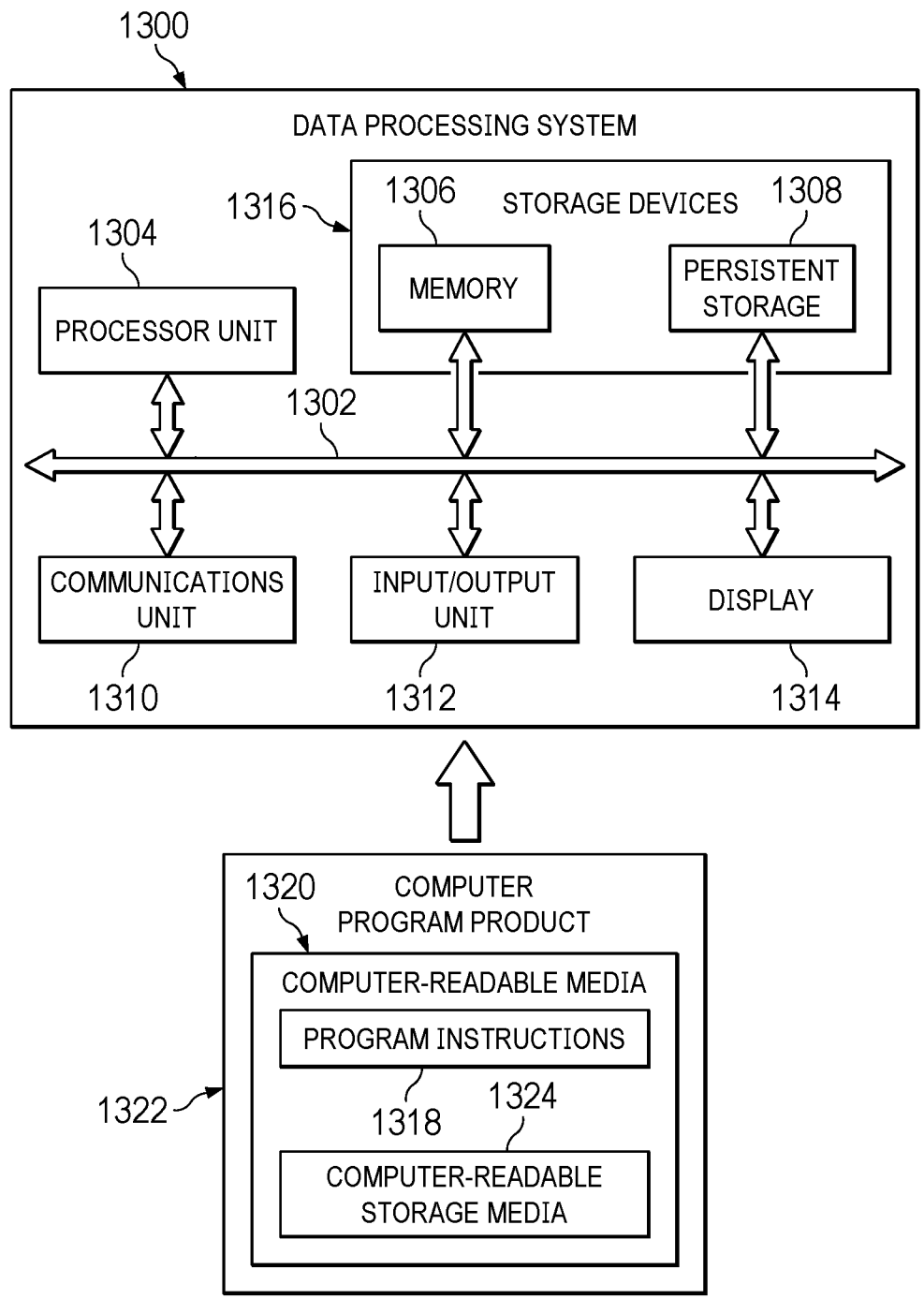
FIG. 13 is a block diagram of a data processing system in accordance with an illustrative embodiment.

Turning now to FIG. 13, a block diagram of a data processing system is depicted in accordance with an illustrative embodiment. Data processing system 1300 can be used to implement computers and computing devices in computing environment 100 in FIG. 1. Data processing system 1300 can also be used to implement computer system 212. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1304 can may be implemented using one or more heterogeneous processor systems in which a main processor is present with secondary processors on a single chip. As another illustrative example, processor unit 1304 can be a symmetric multi-processor system containing multiple processors of the same type on a single chip.

Memory 1306 and persistent storage 1308 are examples of storage devices 1316. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which may be located in a memory, such as memory 1306.

These instructions are referred to as program instructions, computer usable program instructions, or computer-readable program instructions that can be read and executed by a processor in processor unit 1304. The program instructions in the different embodiments can be embodied on different physical or computer-readable storage media, such as memory 1306 or persistent storage 1308.

Program instructions 1318 is located in a functional form on computer-readable media 1320 that is selectively removable and can be loaded onto or transferred to data processing system 1300 for execution by processor unit 1304. Program instructions 1318 and computer-readable media 1320 form computer program product 1322 in these illustrative examples. In the illustrative example, computer-readable media 1320 is computer-readable storage media 1324.

Computer-readable storage media 1324 is a physical or tangible storage device used to store program instructions 1318 rather than a medium that propagates or transmits program instructions 1318. Computer-readable storage media 1324, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1318 can be transferred to data processing system 1300 using a computer-readable signal media. The computer-readable signal media are signals and can be, for example, a propagated data signal containing program instructions 1318. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1320" can be singular or plural. For example, program instructions 1318 can be located in computer-readable media 1320 in the form of a single storage device or system. In another example, program instructions 1318 can be located in computer-readable media 1320 that is distributed in multiple data processing systems. In other words, some instructions in program instructions 1318 can be located in one data processing system while other instructions in program instructions 1318 can be located in one data processing system. For example, a portion of program instructions 1318 can be located in computer-readable media 1320 in a server computer while another portion of program instructions 1318 can be located in computer-readable media 1320 located in a set of client computers.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, may be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program instructions 1318.

Thus, illustrative embodiments of the present invention provide a computer implemented method, computer system, and computer program product for compiling source code. For example, a computer system loads the source code into a first memory. The computer system loads a rendered source code into a second memory, wherein the rendered source code is a rendered version of the source code. The computer system determines whether a difference is present between the source code in the first memory and the rendered source code in the second memory. The computer system performs a set of actions in compiling the source code in response to determining that the difference between the source code and the rendered source code is present.

The illustrative examples enable compiling source code in a manner that avoids issues with invisible Trojan source code. The source code and a rendered version of the source code are compared to determine whether differences are present. If differences are present, the problematic source code is identified to determine whether that source code is Trojan source code. If Trojan source code is present, the compiler can then compile the rendered version of the source code rather than the original source code to avoid compiling a program in a manner that may not have been intended because the invisible source code was missed by a programmer or developer. As a result, the increased security in the compiling execution of code can occur. By automatically detecting invisible Trojan source code, security risks can be reduced for programs. Further, application build teams and security teams can be alerted to the occurrence and suppression of invisible Trojan source code at compile time. In this manner, the original source code can be reviewed and updated as needed.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for compiling a source code, the computer implemented method comprising:
    loading, by a compiler of a computer system, the source code comprising a plurality of control symbols into a first memory;
    rendering, by the compiler, the source code having the control symbols, wherein rendering of the source code modifies the display of the source code based on processing the control symbols;
    loading, by the compiler of the computer system, the rendered source code into a second memory;
    determining, by the compiler of the computer system, whether a difference is present between the source code in the first memory and the rendered source code in the second memory, wherein the difference is caused by the rendered control system;
    in response to determining that the difference is present, determining, by the computer system, whether a problematic source code is present in the source code by analyzing the determined difference;
    in response to determining that the problematic source code is present in the source code, performing, by the compiler of the computer system, a set of actions on the rendered source code, wherein the set of actions comprises modifying the rendered source code by removing the determine problematic source code from the rendered source code; and
    compiling, by the compiler of the computer system, the modified rendered source in place of the source code.

2. The computer implemented method of claim 1, wherein performing, by the compiler of the computer system, the set of actions in compiling the source code in response to determining that the difference between the source code and the rendered source code is present comprises:
    determining, by the compiler of the computer system, whether a problematic source code is present in the source code;
    determining, by the compiler of the computer system, whether the problematic source code is present in a Trojan source pattern repository in response to the problematic source code being present in the source code.

3. The computer implemented method of claim 1, wherein the problematic source code is Trojan source code.

4. The computer implemented method of claim 1 further comprising: determining, by the compiler of the computer system, whether the problematic source code is present within the source code using the difference in response to the difference being present.

5. The computer implemented method of claim 4, wherein the problematic source code is a process modified by control symbols controlling a display of text using a bidirectional algorithm.

6. The computer implemented method of claim 5, wherein the process is one of a function and a subroutine.

7. The computer implemented method of claim 1, wherein the problematic source code comprises control characters that result in a function for compiling and executing code that is not rendered for displaying.

8. A computer system comprising:
    a processor executing a compiler to perform the steps of:
    loading a source code comprising a plurality of control symbols into a first memory;
    rendering the source code having the control symbols, wherein rendering of the source code modifies the display of the source code based on processing the control symbols;
    loading the rendered source code into a second memory;
    determining whether a difference is present between the source code in the first memory and the rendered source code in the second memory, wherein the difference is caused by the rendered control symbols;
    in response to determining that the difference is present, determining whether a problematic source code is present in the source code by analyzing the determined difference;
    in response to determining that the problematic source code is present in the source code, performing a set of actions on the rendered source code, wherein the set of actions comprises modifying the rendered source code by removing the determined problematic source code from the rendered source code; and
    compiling the modified rendered source in place of the source code.

9. The computer system of claim 8, wherein the processor executing the compiler to further perform the step of:
    determining whether the problematic source code is present in a Trojan source pattern repository in response to the problematic source code being present in the source code; and.

10. The computer system of claim 8, wherein the problematic source code is Trojan source code.

11. The computer system of claim 8, wherein the processor executing the compiler to further perform the step of:
    determining whether the problematic source code is present within the source code using the difference in response to the difference being present.

12. The computer system of claim 11, wherein the problematic source code is a process modified by control symbols controlling a display of text using a bidirectional algorithm.

13. The computer system of claim 12, wherein the process is one of a function and a subroutine.

14. The computing system of claim 8, wherein the problematic source code comprises control characters that result in a function for compiling and executing code that is not rendered for displaying.

15. A computer program product for compiling a source code, the computer program product comprising a computer readable storage medium having program instructions embodied therewith, the program instructions executable by a computer system to cause the computer system to perform a method of:
   loading, by a compiler of the computer system, the source code comprising a plurality of control symbols into a first memory;
   rendering, by the compiler, the source code having the control symbols, wherein rendering of the source code modifies the display of the source code based on processing the control symbols;
   loading, by the compiler of the computer system, the rendered source code into a second memory;
   determining, by the compiler of the computer system, whether a difference is present between the source code in the first memory and the rendered source code in the second memory, wherein the difference is caused by the rendered control symbols;
   in response to determining that the difference is present, determining, by the computer system, whether a problematic source code is present in the source code by analyzing the determined difference;
   in response to determining that the problematic source code is present in the source code, performing, by the compiler of the computer system, a set of actions on the rendered source code, wherein the set of actions comprises modifying the rendered source code by removing the determined problematic source code from the rendered source code; and
   compiling, by the compiler the computer system, the modified rendered source in place of the source code.

16. The computer program product of claim 15, wherein performing, by the computer system, the set of actions in compiling the source code comprises:
   determining, by the computer system, whether the problematic source code is present in a Trojan source pattern repository in response to the problematic source code being present in the source code.

17. The computer program product of claim 15, wherein the problematic source code is Trojan source code.

18. The computer program product of claim 15 further comprising: determining, by the compiler of the computer system, whether the problematic source code is present within the source code using the difference in response to the difference being present.

19. The computer program product of claim 18, wherein the problematic source code is a process modified by control symbols controlling a display of text using a bidirectional algorithm.

20. The computer program product of claim 15, wherein the problematic source code comprises control characters that result in a function for compiling and executing code that is not rendered for displaying.

* * * * *